US009046074B2

(12) United States Patent
Patel et al.

(10) Patent No.: US 9,046,074 B2
(45) Date of Patent: *Jun. 2, 2015

(54) SPLIT COLLAR MOUNTABLE WIND TURBINE

(71) Applicant: Lilu Energy, Inc., Rancho Santa Margarita, CA (US)

(72) Inventors: Mahesh N. Patel, Rancho Santa Margarita, CA (US); Darmesh M. Patel, Rancho Santa Margarita, CA (US)

(73) Assignee: Lilu Energy, Inc., Rancho Santa Margarita, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/794,282

(22) Filed: Mar. 11, 2013

(65) Prior Publication Data

US 2014/0252773 A1    Sep. 11, 2014

(51) Int. Cl.
  *F03D 9/00* (2006.01)
  *H02P 9/04* (2006.01)
  *B66B 9/00* (2006.01)
  *E04H 6/06* (2006.01)
  *E04H 12/00* (2006.01)
  *F03D 3/00* (2006.01)

(52) U.S. Cl.
  CPC ............ *F03D 3/005* (2013.01); *F03D 9/002* (2013.01); *F05B 2240/912* (2013.01); *F05B 2240/913* (2013.01); *F05B 2240/941* (2013.01); *F05B 2260/4031* (2013.01); *Y02E 10/74* (2013.01); *Y02E 10/728* (2013.01)

(58) Field of Classification Search
  CPC .......................... Y02B 10/30; F03D 11/0008

USPC ....... 290/44, 55, 54, 1 R, 7; 415/2.1, 4.1, 4.2, 415/4.4, 905, 907, 909, 53.1–53.3; 416/244 R, 244 A, 178, 187, DIG. 6, 416/DIG. 8

See application file for complete search history.

(56) References Cited

U.S. PATENT DOCUMENTS 3,743,848 A * 7/1973 Strickland ....................... 290/55
4,095,422 A * 6/1978 Kurakake ....................... 60/398

(Continued)

OTHER PUBLICATIONS

"International Search Report and Written Opinion of the International Searching Authority", PCT/US2014/022551. Mailing date of International Search Jul. 1, 2014 (15 pages).

(Continued)

*Primary Examiner* — Tulsidas C Patel
*Assistant Examiner* — Charles Reid, Jr.
(74) *Attorney, Agent, or Firm* — Stetina Brunda Garred & Brucker

(57) ABSTRACT

A split collar mountable turbine that can be assembled in two separate halves and adapted to be attached circumferentially around existing structures. Top and bottom attachment rings each comprise first and second arcuate elements adapted to interconnect circumferentially about an axis to form two rings. A fan blade housing ring comprising first and second arcuate elements, adapted to interface into complimentary slots within the top and bottom rings, and also adapted to interconnect circumferentially about an axis to form a fan blade housing ring and is received in complimentary slots. The fan blade housing ring moves in tracks located in the top and bottom rings. Located within the fan blade housing are two pair of off-axis electrical generators driven by rotation of said fan blade housing to produce electricity.

20 Claims, 9 Drawing Sheets

(56) References Cited

U.S. PATENT DOCUMENTS

| | | | |
|---|---|---|---|
| 4,818,888 A * | 4/1989 | Lenoir, III | 290/43 |
| 6,302,640 B1 * | 10/2001 | McKelvey | 415/58.5 |
| 6,672,522 B2 | 1/2004 | Lee et al. | |
| 6,740,989 B2 | 5/2004 | Rowe | |
| 7,323,791 B2 | 1/2008 | Jonsson | |
| 7,329,965 B2 | 2/2008 | Roberts et al. | |
| 7,969,036 B2 | 6/2011 | Chung | |
| 8,164,213 B2 | 4/2012 | Mahaffy et al. | |
| 8,197,179 B2 | 6/2012 | Selsam | |
| 8,362,641 B2 | 1/2013 | Gandy | |
| 8,497,592 B1 * | 7/2013 | Jones | 290/44 |
| 2003/0170123 A1 * | 9/2003 | Heronemus | 416/41 |
| 2004/0071541 A1 * | 4/2004 | Rainbow | 415/4.2 |
| 2007/0022738 A1 * | 2/2007 | Norris et al. | 60/226.1 |
| 2008/0169652 A1 | 7/2008 | Green | |
| 2008/0304968 A1 * | 12/2008 | Fite | 416/140 |
| 2009/0224554 A1 | 9/2009 | Flynn | |
| 2010/0013238 A1 | 1/2010 | Jessie et al. | |
| 2010/0026009 A1 | 2/2010 | Sarwin | |
| 2010/0090469 A1 * | 4/2010 | Sullivan | 290/55 |
| 2010/0132234 A1 | 6/2010 | Winkler | |
| 2010/0133820 A1 | 6/2010 | Tsao | |
| 2010/0158673 A1 * | 6/2010 | Keene | 415/121.3 |
| 2010/0237626 A1 * | 9/2010 | Hamner | 290/54 |
| 2010/0244453 A1 | 9/2010 | Dornan | |
| 2010/0254799 A1 * | 10/2010 | Caines | 415/36 |
| 2010/0301609 A1 * | 12/2010 | Kim et al. | 290/54 |
| 2011/0025070 A1 | 2/2011 | Price | |
| 2011/0062717 A1 | 3/2011 | Price, Jr. | |
| 2011/0103942 A1 * | 5/2011 | Green et al. | 415/183 |
| 2011/0107684 A1 * | 5/2011 | Flores | 52/29 |
| 2011/0116932 A1 | 5/2011 | Poon | |
| 2011/0318161 A1 * | 12/2011 | Miljkovic | 415/1 |
| 2012/0019002 A1 * | 1/2012 | Lee | 290/50 |
| 2012/0080886 A1 * | 4/2012 | Ju | 290/55 |
| 2012/0148403 A1 * | 6/2012 | Flaherty et al. | 416/1 |
| 2012/0242087 A1 * | 9/2012 | Ruder | 290/55 |
| 2013/0043082 A1 | 2/2013 | Tran | |
| 2013/0323056 A1 * | 12/2013 | Su | 416/9 |
| 2013/0336811 A1 * | 12/2013 | Muller et al. | 417/53 |
| 2014/0147274 A1 * | 5/2014 | Longmire et al. | 416/13 |
| 2014/0217738 A1 * | 8/2014 | Lipman | 290/54 |

OTHER PUBLICATIONS

Reid Jr., Charles H., Non Final Office Action, Oct. 20, 2014, pp. 1-22, U.S. Appl. No. 14/201,681.

* cited by examiner

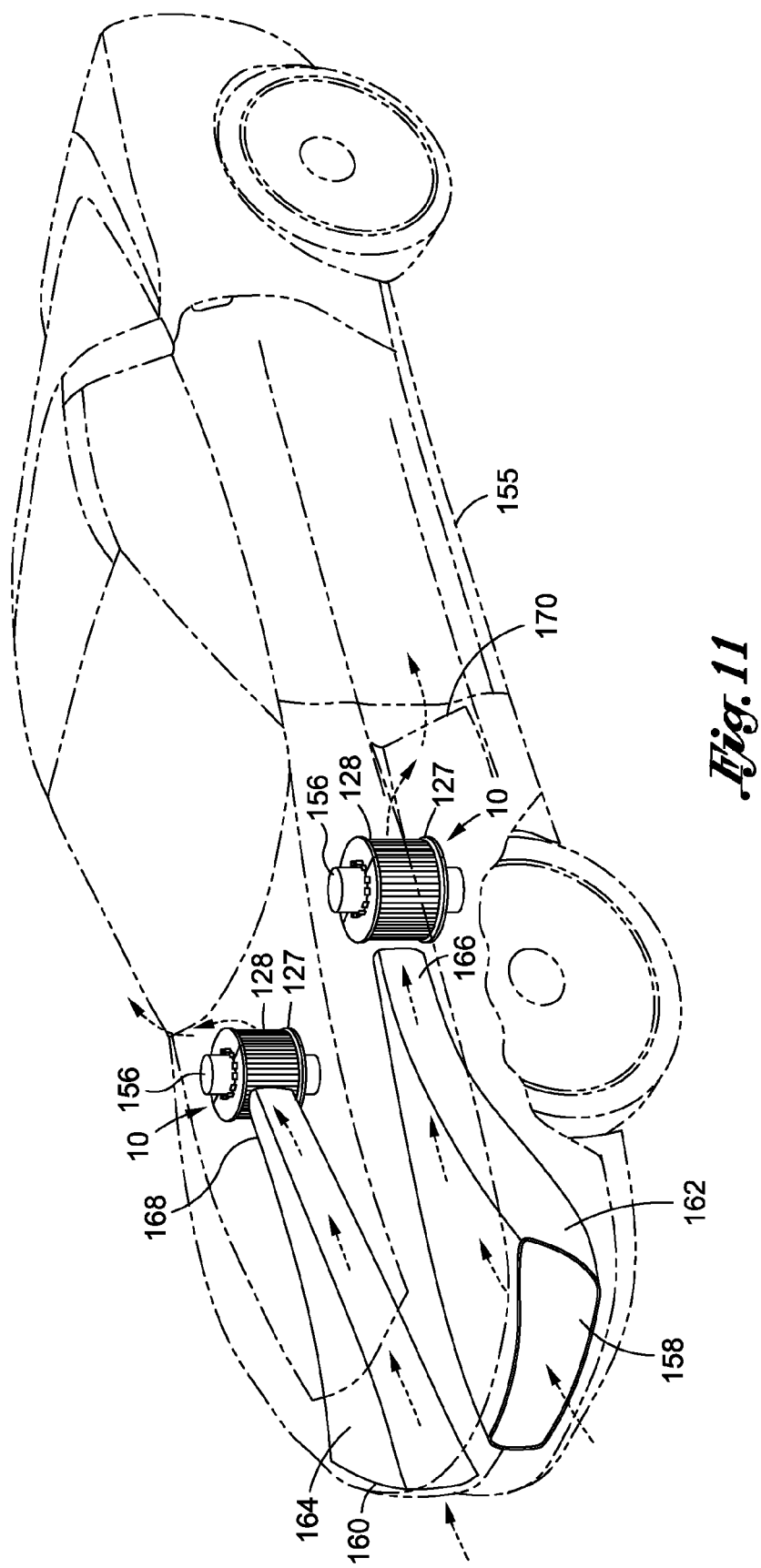

SPLIT COLLAR MOUNTABLE WIND TURBINE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates to a wind turbine used to convert wind forces into electrical energy. More particularly, the present invention relates to a wind turbine and combined generator having a cylindrical shaped structure, formed in split halves adapted to be concentrically affixed about an elongate shaft or similar structure.

2. Related Art

The need and demand for renewable energy is increasing as an alternative to traditional fossil fuels and nuclear power. Existing devices and methods adapted to harness renewable sources, such as wind power, may have the unwelcome effect of creating large and noticeable physical footprints on existing landscapes. Existing wind turbines require installation on tall masts with sufficient horizontal and lateral clearance and rights of way and accessibility to an electrical grid. Wind farms that use existing wind turbines may be located in less densely populated areas and may utilize large tracts of valuable land and many times increase the cost of kilowatt hour due the requirement of construction of access to electrical grids. Wind generators located in more densely populated areas may block views, block sunlight, create noise and otherwise may be ascetically undesirable. In addition, existing horizontal and vertical wind turbines can be a danger to certain bird populations.

A common wind turbine structure includes a single large propeller affixed at the top end of a vertical mast. Airflow across the blades, airfoils or the propellers cause rotation activating a generator to produce electricity. Because of the length of the blades and the size of propeller, many times such wind turbines are affixed atop very tall masts making maintenance and repair difficult. The high placement also takes advantage of higher winds having more force to move the massive propeller blades. Also the installation of the masts are expensive and are required to support a significant amount of weight to support both the blades and generator which is typically located at the center of the blades. A conventional propeller type wind turbine with blades also typically rotates perpendicular to wind direction requiring expensive mechanisms to rotate either or both of the forward direction of the proper, or the angle of the propeller blades.

Accordingly, there is a need in the art for devices and methods to generate renewable energy from wind and airflow forces that has a minimized physical impact on the livable landscape and environment and which can capitalize on existing infrastructure and electrical grid interfaces. Also, there is a need in the art for devices and methods to create electricity from wind flow forces that minimize adjustments in the turbine orientation decreasing the complexity of the wind turbines and decreasing costs of manufacture, maintenance and control.

BRIEF SUMMARY

The present invention relates to a mountable wind turbine adapted to take advantage of existing infrastructure as it can be attached and retrofitted to existing structures such as light poles, power poles, water towers, traffic light arms, existing wind turbine masts, billboards, communications towers and similar existing structures. Because the device can be retrofitted onto existing structures that have pre-existing access to electric grid, the wind turbine of the present invention can be utilized with significant costs savings over a wind turbine that requires its own mast structure, real-estate plot and constructed power grid access. In addition, the wind turbine of the present invention additionally provides the advantage of potentially powering devices associated with the structure to which it is attached such as a traffic light on a light pole, equipment on a communications tower, traffic light or alternative to provide power to one or more battery storage units that provides back up power.

In accordance with one embodiment of the present disclosure, a split collar mountable wind turbine includes a first top ring comprising first and second arcuate elements, said first and second arcuate elements are adapted to interconnect circumferentially about an axis to form an interconnected ring along with a second bottom ring comprising first and second arcuate elements, said first and second arcuate elements adapted to interconnect circumferentially about an axis to form an interconnected bottom ring. A fan blade housing ring comprising first and second arcuate elements, each of said arcuate elements having a first end adapted to interface into a slot within said first top ring, and a second end adapted to interface with a slot second bottom ring and blade elements interconnected between said first end and said second end of each of said arcuate elements, said arcuate elements adapted to interconnect circumferentially about an axis to form an said fan blade housing ring. Located within the housing is two pair of off-axis electrical generators each generator having rotating gears, said rotating gears are driven by rotation of said fan blade housing ring about an axis, which turns the generators in order for the generators to produce electricity. The generators may be in electrical connection with the power grid to supply power or to otherwise provide electric power to a local device or battery back up.

Wind forces engage the blades of the fan housing, and force rotation of the fan blade housing in a circular direction about the attachment rings, within groves formed in the attachment rings. The attachment ring groves may have bearings or alternatively rollers to provide free rotation of the housing within the track. As a further alternative, the grooves of the attachment rings may include rare earth magnets to provide magnetic levitation of the fan blade housing within the attachment ring grooves to aid in providing reduced frictional movement of the fan blade housing. Magnetic levitation can also be achieved by use of electro magnets formed in the attachment ring grooves. The blade housing can also be designed to create its own lift when spinning to cut down on friction and ease stress of the bottom attachment ring.

It is contemplated by the present invention that the fan turbine of the present invention can be assembled in two separate halves, for ease of attachment and adapted to be attached circumferentially around existing structures such as electrical pole, light poles and traffic poles. A series of set screws and set guides can be adjusted to engage and be supported by a structure that the collar mount wind turbine of the present invention surrounds. Because of the numerous set screws, the set screws can be adjusted to engage non cylindrical surfaces such as the square cross section of chimney or other irregularly shaped support structure.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 11 shows the wind turbine of the present invention adapted for use in association with the air intake of a motor vehicle in accordance with one embodiment of the present disclosure;

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first, second, and the like are used solely to distinguish one element from another without necessarily requiring or implying any actual such relationship or order between such elements.

Existing structures such as light poles, traffic light arms, communication towers, wind turbine masts, chimneys and smoke stacks are commonplace in the modern landscape in both rural and urban communities. In most instances, these types of structures have existing access to the power grid associated with the structure's function or devices attached to the structures. The split collar shaft mountable wind turbine of the present invention takes advantage of existing infrastructure as it can be attached and retrofitted to existing structures such as light poles, power poles, water towers, traffic light arms, existing wind turbine masts, billboards, support structures, communications towers and similar existing structures. Because the device can be retrofitted onto existing structures that have pre-existing access to electric grid, the wind turbine of the present invention can be utilized with significant costs savings over a wind turbine that might require its own mast structure, real-estate plot and/or constructed power grid access. In addition, the wind turbine of the present invention additionally provides the advantage of potentially powering devices associated with the structure to which it is attached such as a traffic light on a light pole, equipment on a communications tower, traffic light or provide power to battery storage unit associated with such devices that can be used to store a charge.

Figure 1:
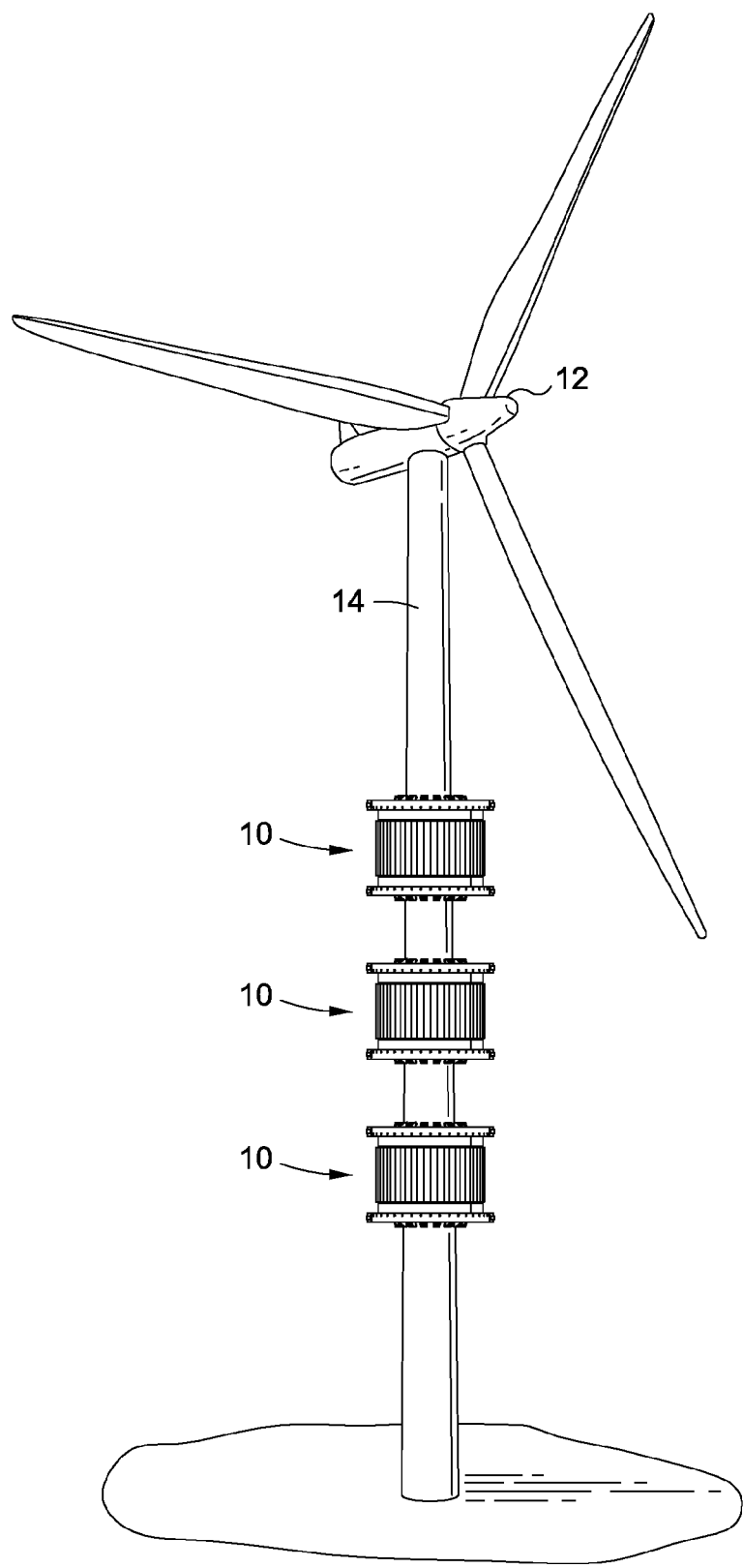
FIG. 1 shows three of the wind turbines of the present invention affixed to an existing wind turbine pole in accordance with one embodiment of the present disclosure.
Figure 9:
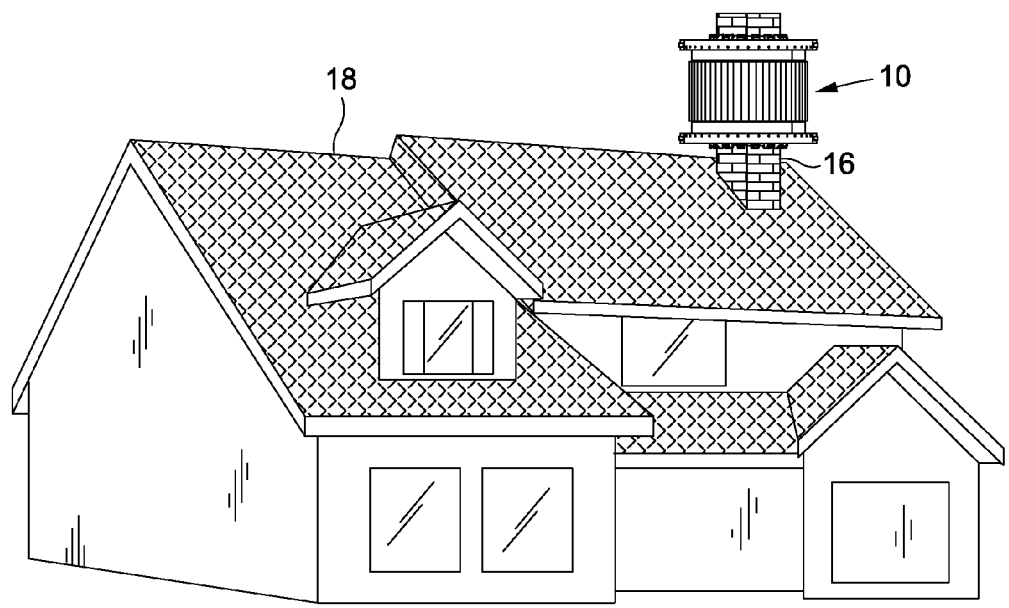
FIG. 9 shows the wind turbine of the present invention affixed to an existing house chimney in accordance with one embodiment of the present disclosure.
Figure 10:
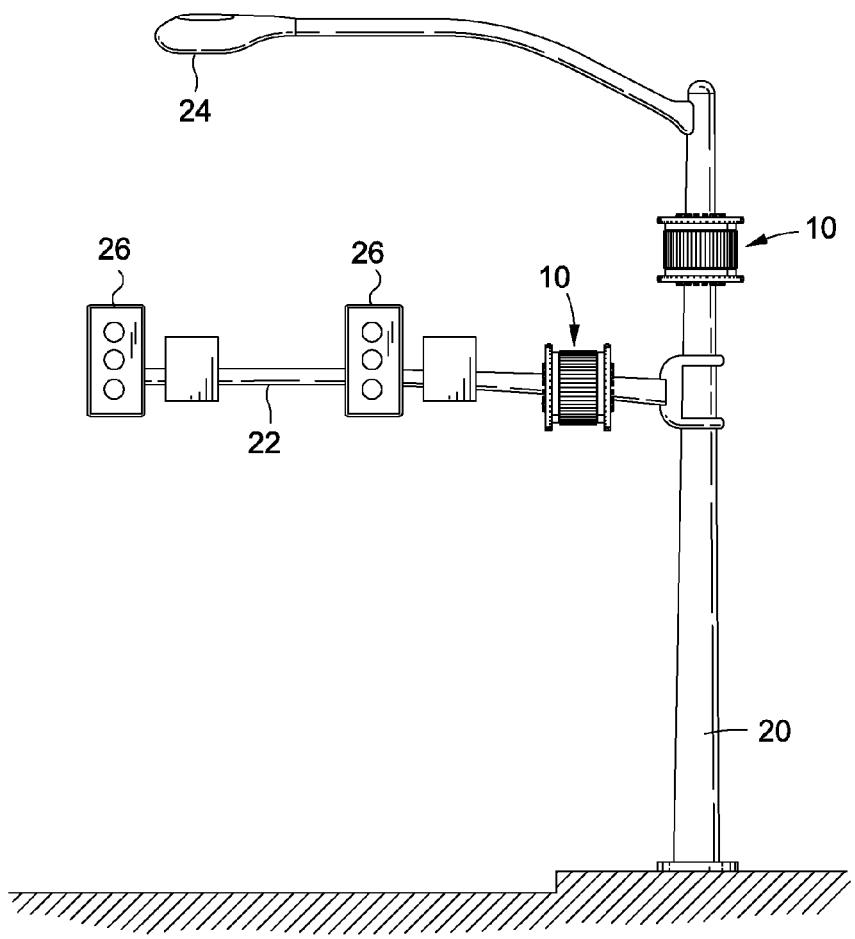
FIG. 10 shows the wind turbine of the present invention affixed to an existing vertical light pole and a second shaft mount turbine of the present invention affixed to a generally horizontal traffic light arm in accordance with one embodiment of the present disclosure.

Referring particularly to the drawings, embodiments of the split collar mountable wind turbine of the present invention are shown. In particular, FIGS. 1, 9 and 10 show examples of the attachment of the wind turbine 10 of the present invention. In the example of FIG. 1, there is shown a prior art propeller type wind turbine 12 affixed to the top of a mast 14. The split collar turbine 10 of the present invention is adapted to the attached circumferentially about the vertical mast 14. In the example as shown in FIG. 1, three turbines 10 are attached to the masts in serial fashion. In the example of FIG. 1, a tall mast 14 is particularly suited as an existing structure to provide a support base for one or more of the turbines 10 of the present invention. Because the turbines 10 are fixedly attached to the mast 14 in the example of FIG. 1 they can be spaced at various locations about the length of the mast 14. The mechanism for attachment of the mast is discussed more fully below.

In the example of FIG. 1, one or more turbines 10 can supply power to the power grid or alternatively could provide additional power to a battery backup (not shown) of the propeller wind generator 12, and may additionally provide power to mechanisms that direct the propeller type wind turbine 12 into the direction of the wind for maximum efficiency. Although three turbines 10 are shown in FIG. 1, any number of turbines 10 could be affixed to the mast 14 depending on space and weight limitations.

Figure 7:
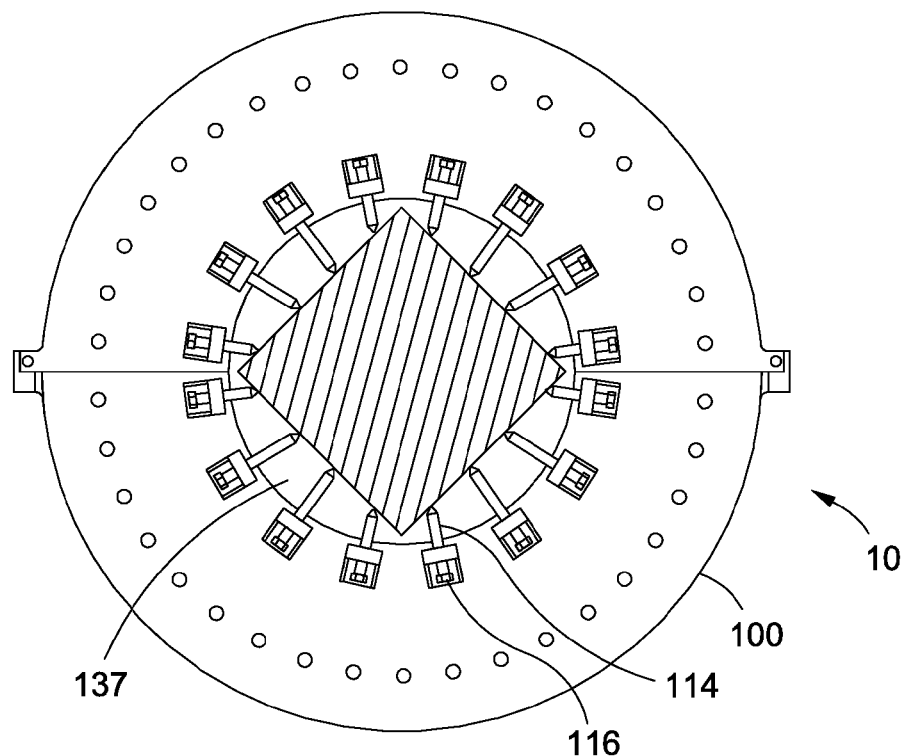
FIG. 7 is a cross sectional schematic view of the wind turbine of the present invention with mount adaptors engaged with a structure having a square cross section in accordance with one embodiment of the present disclosure.
Figure 8:
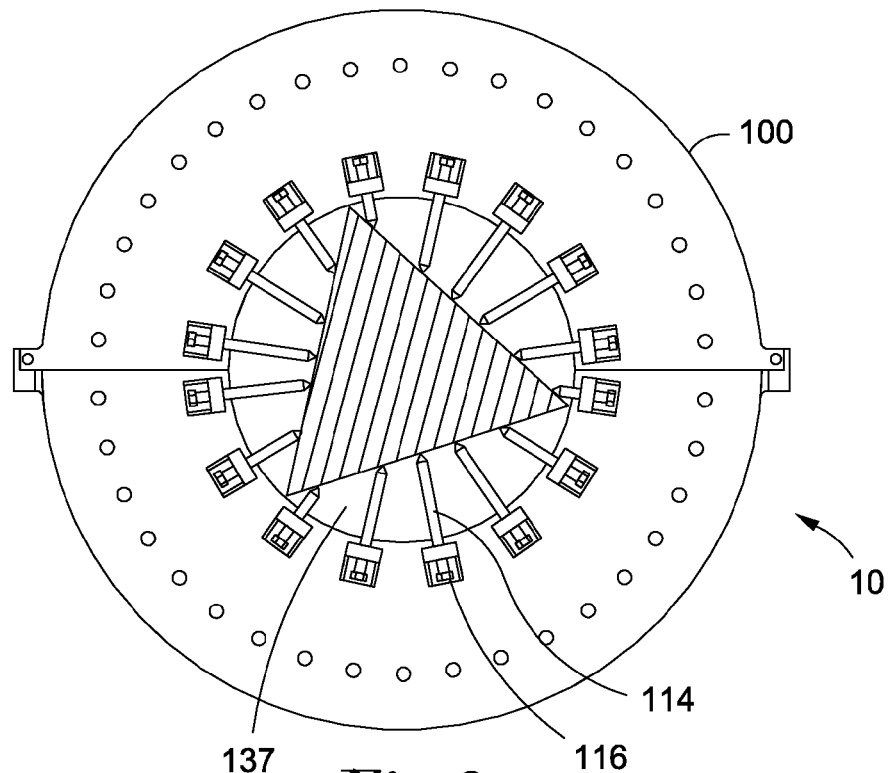
FIG. 8 is a cross sectional schematic view of the wind turbine of the present invention with mount adaptors engaged with a structure having a triangular cross section in accordance with one embodiment of the present disclosure.

Another example of mounting the turbine 10 onto preexisting structures is demonstrated in FIG. 9. The turbine 10 is affixed to the chimney 16 of a residential house 18. As described in more detail with regard to FIG. 7, the hollow center of the collar is adapted to receive the square structure of the chimney 16. A series of set screws 114 can be adjusted to engage the surface of a square structure such as shown in FIG. 7 or other shape such as shown in FIG. 8. Due to the large number of set screws 114 it is contemplated by the present invention a variety of shapes of support structures can be accommodated and used as a support. It is additionally contemplated by the invention that the turbine 10 could be affixed to other types of exhaust structures such as smoke stacks on factories and other similar edifices. A further example is shown in FIG. 10 where the turbine 10 can be attached to a vertical light pole 20 or a horizontal traffic light arm 22. The examples as shown in FIGS. 1, 7-10 are merely exemplarily and it is contemplated that the wind turbine 10 of the present invention could be affixed to many types of structures in various orientations. In addition to preexisting structures, it is contemplated by the present invention that a support structure can be specially constructed to support the turbine 10 of the present in invention. For example, a pole can be installed into the ground for the custom purpose of supporting one or more of the wind turbines 10 of the present invention. In addition, it is contemplated by the present invention that the alternate means of attaching the wind turbine of the present invention may be employed such as a clamping mechanism or other means of structural attachment as known by one skilled in the art.

The low profile of the turbine 10 of the present invention allows it to be affixed to preexisting structures and minimizing interference with the surrounding area. As demonstrated in FIG. 10, the turbine 10 can be secured to the light pole 20 without interfering with the normal operation of the light pole and is of sufficiently light structure as to not over burden the structure of the light pole 20. The turbine 10, as demonstrated in FIG. 10, could provide main or auxiliary power to a light 24. Alternatively, the turbine 10 could supply power to a battery backup (not shown) for the light pole 20, or alternatively, the electrical output of the turbine 10 could be connected directly to a power grid to provide power back into the power grid system. Similarly, the turbine 10 can supply power to traffic lights 26 of the light pole 20. Likewise, the turbine 10 as demonstrated in the example of FIG. 9 could provide an additional power source to a residential house 18, could provide power to a battery backup system (not shown) or otherwise interconnect to the power grid to provide power back into the system.

Figure 2:
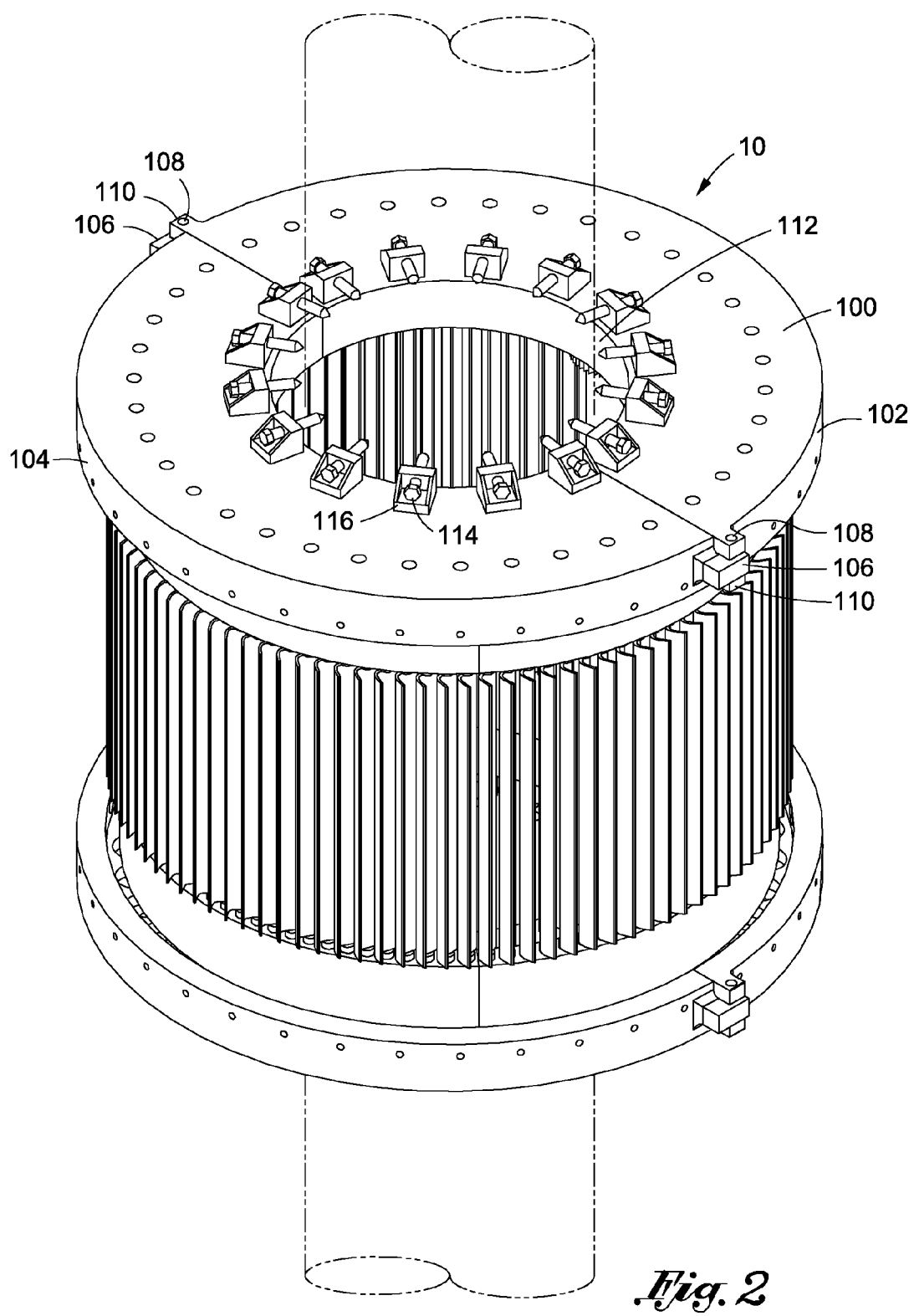
FIG. 2 is a top perspective view of the wind turbine of the present invention in its environment, with a shaft shown in broken lines in accordance with one embodiment of the present disclosure.
Figure 3:
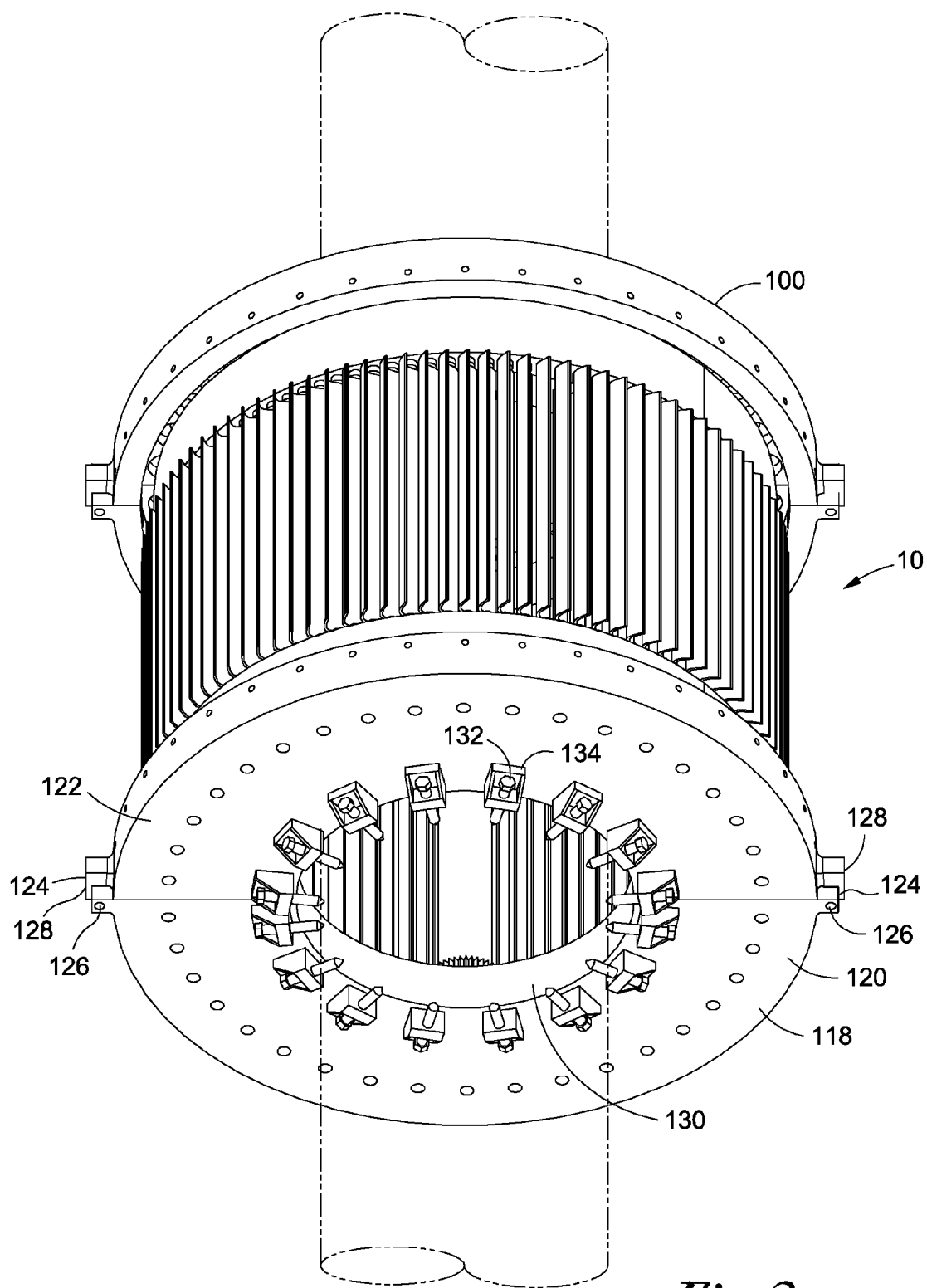
FIG. 3 is a bottom perspective view of the wind turbine of the present invention in its environment, with a shaft shown in broken lines in accordance with one embodiment of the present disclosure.

Referring particularly to FIGS. 2 and 3, there is shown wind turbine of the present invention, with a top perspective view in FIG. 2 and a bottom perspective view in FIG. 3. FIG. 2 demonstrates a top attachment ring 100 that includes arcuate half rings 102 and 104. Although the top attachment ring 100 is comprised of half rings 102 and 104 each comprising one half of the top attachment ring 100, it is contemplated by the present invention that the top ring can be comprised of arcuate elements that are not of equal circumference or alternatively the top attachment ring could be a unitary structure.

The half rings 102 and 104 are interlocked by flanges 106, pin guide 110 and pin 108. The flange 106 nests in the groove of a pin guide 110. The flange 106 and pin guide 110 have corresponding apertures such that when the flange 106 is nested in the pin guide 110 the apertures align allowing a pin 108 to be inserted through the pin guide 110 and flange 106 to interlock ring halves 102 and 104 to form the top attachment ring 100. In the embodiment shown in FIG. 2 half ring 102 includes pin guides 110 on each side of the half ring while the half ring 104 includes oppositely formed flanges 106 to mate with the ring half 102. Although the flange and pin guide arrangement are segregated between ring halves 102 and 104 as shown in FIG. 2 it is additionally contemplated by the present invention that the half rings could each include one flange and one pin guide that also mates with the corresponding half ring structure. It is further contemplated that the top ring 100 could be formed as a single ring, or a ring formed of three or more interlocking pieces.

As shown in FIG. 2 the semicircular half rings 102 and 104 form an annular attachment ring 100 having a center opening 112. Although the embodiment shown in FIG. 2 includes a circular opening 112, it is contemplated that the aperture formed in the top attachment ring could have an opening in a shape other than a circle to accommodate the structure to be received within opening 112. In operation when the attachment ring 100 is attached to a structure, a gap 137 (examples shown in FIGS. 7 and 8) allows for airflow in and out of the interior of the blade housing 127.

A plurality of set screws 114 are engaged with set guides 116. The set guides 116 are rigidly attached to the ring 100. In operation, the set screws 114 are rotated to move the set screws inward or outward to engage a structure that is placed in the opening 112. The set screws 114 engage and grip a structure located within the aperture 112 to assist in holding the entire structure of the wind turbine 10 to the intervening structure. In this regard, the wind turbine 10 can be attached removed or adjusted upon a structure that is located within the opening 112.

FIG. 3 demonstrates a bottom attachment ring 118 that includes arcuate half rings 120 and 122. Although the bottom attachment ring 118 is comprised of half rings 120 and 122 each comprising one half of the bottom attachment ring 118, it is contemplated by the present invention that the bottom ring 118 can be comprised of arcuate elements that are not of equal circumference or the bottom ring 118 could be formed of a unitary structure.

The half rings 120 and 122 are interlocked by flanges 124, pin guide 128 and pin 126. The flange 124 nests in the groove of a pin guide 128. The flange 124 and pin guide 128 have corresponding apertures such that when the flange 124 is nested in the pin guide 128 the apertures align allowing a pin 126 to be inserted through the pin guide 128 and flange 124 to interlock ring halves 120 and 122 to form the bottom attachment ring 118. In the embodiment shown in FIG. 3 half ring 120 includes pin guides 128 on each side of the half ring while the half ring 122 includes oppositely formed flanges 124 to mate with the ring half 120. Although the flange and pin guide arrangement are segregated between ring halves 120 and 122 as shown in FIG. 3 it is additionally contemplated by the present invention that the half rings could each include one flange and one pin guide that also mates with the corresponding half ring structure. It is further contemplated that the bottom ring 118 could be formed as a single ring, or a ring formed of three or more interlocking pieces.

As shown in FIG. 3 the semicircular half rings 120 and 122 form an annular attachment ring 118 having a center opening 130. Although the embodiment shown in FIG. 3 includes a circular opening 130, it is contemplated that the aperture formed in the bottom attachment ring 118 could have an opening in a shape other than a circle to accommodate the structure to be received within opening 130. In operation when the attachment ring 118 is attached to a structure, a gap 135 (examples shown in FIG. 6) allows for airflow in and out of the interior of the blade housing 127.

A plurality of set screws 132 are engaged with set guides 134. The set guides 134 are rigidly attached to the ring 118. In operation, the set screws 132 are rotated to move the set screws inward or outward to engage a structure that is placed in the opening 130. The set screws 132 engage and grip a structure located within the aperture 130 to assist in holding the entire structure of the wind turbine 10 an intervening structure. In this regard, the wind turbine 10 can be attached removed or adjusted upon a structure that is located within the opening 130.

Figure 4:
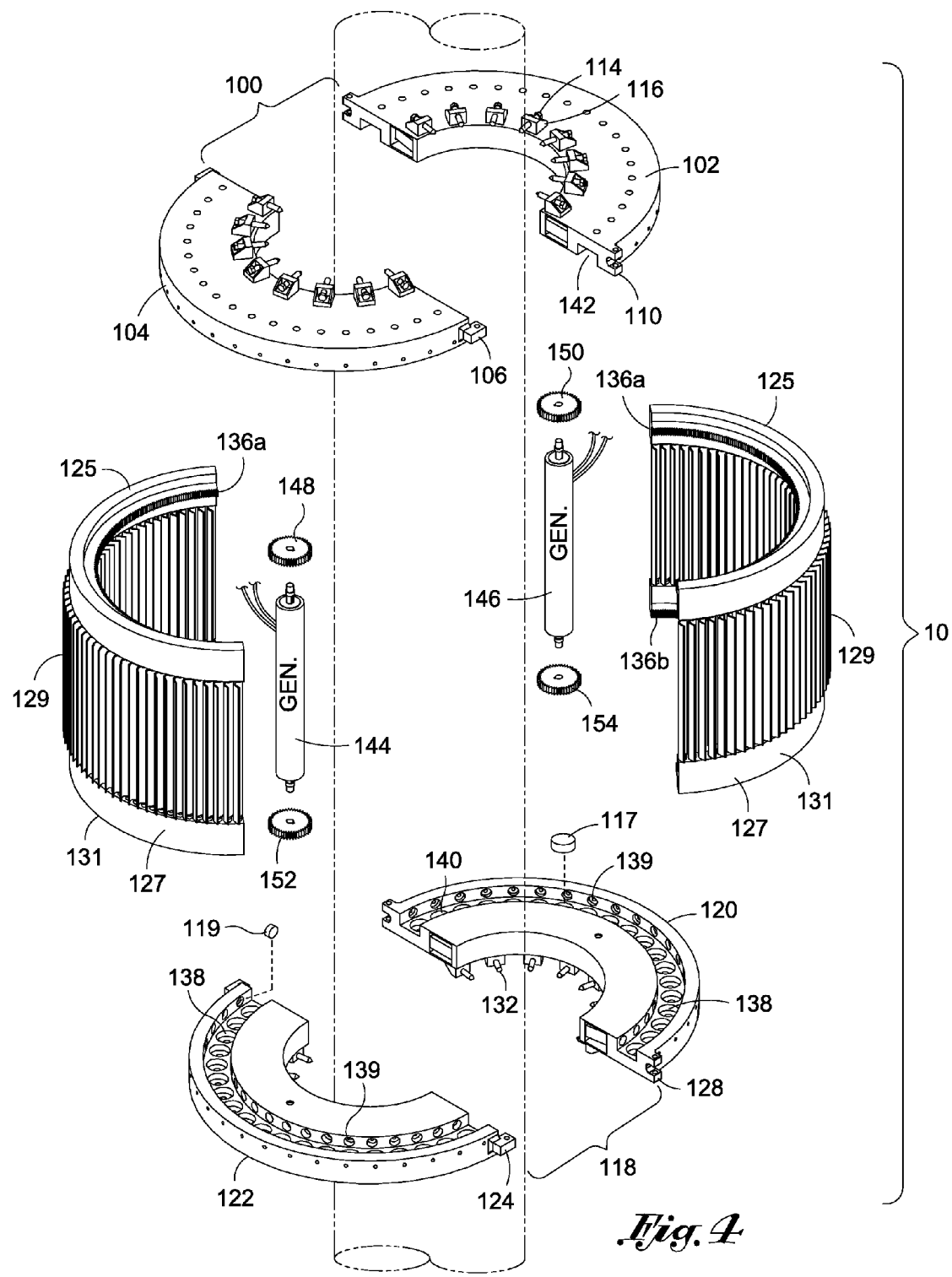
FIG. 4 is an exploded view of the wind turbine of the present invention in accordance with one embodiment of the present disclosure.

Referring particularly FIG. 4 there is shown an exploded view of the wind turbine of the present invention. The exploded view shows top ring 100 and bottom ring 118 along with blade housing 127 that includes a plurality of blades 129 interconnected between a top housing ring 125 and a bottom housing ring 131. The blade housing 127 forms a complete cylinder, shown as separated in drawing FIG. 4. The two halves of the blade housing 127 may be attached together by a standard bolt and nut construction (not shown) at the top housing ring 125 and bottom housing ring 131. Alternatively a screw clamp system or connector plates may be employed. The bolt and nut construction is placed at both ends where the two blade housing halves meet, to let them act as one cylindrical piece as the blade housing 127.

The blade housing 127 incorporates a blade housing gear interface 136a formed on the top housing ring 125 and a lower gear interface 136b. The blade housing cylinder 127 interfaces with grooves formed in the top attachment ring 100 and bottom attachment ring 118. More particularly, as demonstrated in bottom attachment ring 118 a turbine channel groove 138 is formed on the upward surface of each of the ring halves 120 and 122. When the ring halves 120 and 122 are connected, a complete groove channel 138 is formed in the ring 118 to interface with the bottom ring 131 of the blade housing 127. The bottom ring 131 is magnetized. Alternatively a series of rare earth magnets may be formed about the bottom ring 131 on the sides and bottom of the ring 131 that mates with the groove 138. As a further alternative an electromagnet may be employed. As demonstrated in FIG. 4 the groove 138 includes a plurality of recesses 140 for receiving rare earth magnets 117, the recesses 140 formed in the bottom of the groove 138. Also rare earth magnet recesses 139 are formed along the both sides of the sidewalls of the groove 138 to accept rare earth magnets 119. When the blade housing cylinder 127 is inserted into the groove 138, the housing 127 is free to rotate within the groove 138 through magnetic levitation. Although the example of FIG. 4 includes the use of rare earth magnets, it is additionally contemplated that electromagnets may be employed as well as bearings or other types of rollers which would allow the blade housing to rotate within the groove of the bottom attachment ring 118. Likewise, the top attachment ring 100 includes a groove 142 to interface with the top ring 125 of the blade housing 127. The top ring 125 is magnetized. Alternatively a series of rare earth magnets may be formed about the top ring 125 on the sides and bottom of the ring that mates with the groove 142. As a further alternative an electromagnet may be employed. The groove 142 is formed in ring halves 102 and 104 in the identical configuration as ring halves 120 and 122 and additionally utilizes rare earth magnets (not shown) formed in ring halves 102 and 104 in the identical configuration as ring halves 120 and 122 to employ magnetic levitation as a means of providing a reduced friction means of rotating the blade housing 127 between the attachment rings 118 and 100. It is contemplated that although rare earth magnets are contemplated in the groove 142 in the top ring 100, other types of magnetic levitation can be employed or alternatively movement of the blade housing 127 by bearings or other rollers incorporated into the groove 142.

As such, in operation, the blade housing 127 nests within the grooves 138 of the bottom attachment ring 118 and the top groove 142 of the top attachment ring 100 so that the blade housing 127 can rotate freely between the rings 100 and 118. In this regard, a wind force acting upon a blade of the blade housing 127 will cause rotation of the blade housing 127. Because the blade housing 127 is cylindrical, a wind force coming from any lateral direction can cause force upon the blades 127 causing rotation of the blade housing 127. The wind turbine blades 129 work like a sail with airflow around the rounded blades 129 causing forward movement of blade housing. The airflow around the blades 129 may also create lift for the housing 127. It is contemplated that the blades 129 may be comprised of a variety of shapes and cross sections as are commonly used and known by one skilled in the art for use in wind turbines. Also the blades 129 can be attached to the housing by pivots that can be driven to rotate, and the housing 127 maybe computerized to cause the blades 129 to open and close, to capture more wind in low wind condition and prevent damage in high wind conditions. As shown, the blades are 129 are evenly spaced about the housing 127, however it is contemplated that any number of blades can be employed with blades of varying sizes. For example the rotating housing 127 can have a little as one blade 127, or a large number of blades within the physical limitations of the housing 127. The invention employs four generators located in generator pairs 144 and 146. Each generator pair is enclosed in unitary housing structures 144 and 146. Generator pair 144 includes a bottom generator attached to gear 152 and a top generator attached to gear 148. Likewise, generator pair 146 includes a bottom generator attached to a gear 154 and the top generator is attached to a gear 150. The rotation of the blade housing 127 causes an interaction with generator pairs 144 and 146 to drive the generators pairs 144 and 146. In the shown embodiment, four generators are employed, including generator pair 144 and generator pair 146, although it is contemplated that the present invention can utilize as little as one generator or two or more generators up to any number that is within the physical limitations of the housing 127. Each of the generator pairs 144 and 146 include top gears 148 and 150 respectively along with bottom gears 152 and 154 respectively. For example, with respect to generator pair 146, the generator attached to top gear 150 interfaces with the gear interface 136a of the blade housing 127 and the generator attached to bottom gear 154 interfaces with the bottom gear interface 136b of the blade housing 127. As shown, each generator pair 144 and 146 includes two generators (not shown) stacked in opposite directions inside a support cylinder forming generators pairs 144 and 146. In operation, as the blade housing 127 rotates, it causes rotation of gear 148 attached to a generator in generator pair 144 and gear 152 attached to a generator in generator pair 144 and gear 150 attached to a generator in generator pair 146 and gear 154 attached to a generator in generator pair 146 causing each of the generators in generator pairs 144 and 146 to rotate and to generate electricity by known methods to those skilled in the art. The generators to be used in the wind turbine of the present invention will be known generators as understood by one skilled in the art. Known generators are employed having coils and magnets generating an electrical field which is harvested by the coils and converted into electricity.

Figure 5:
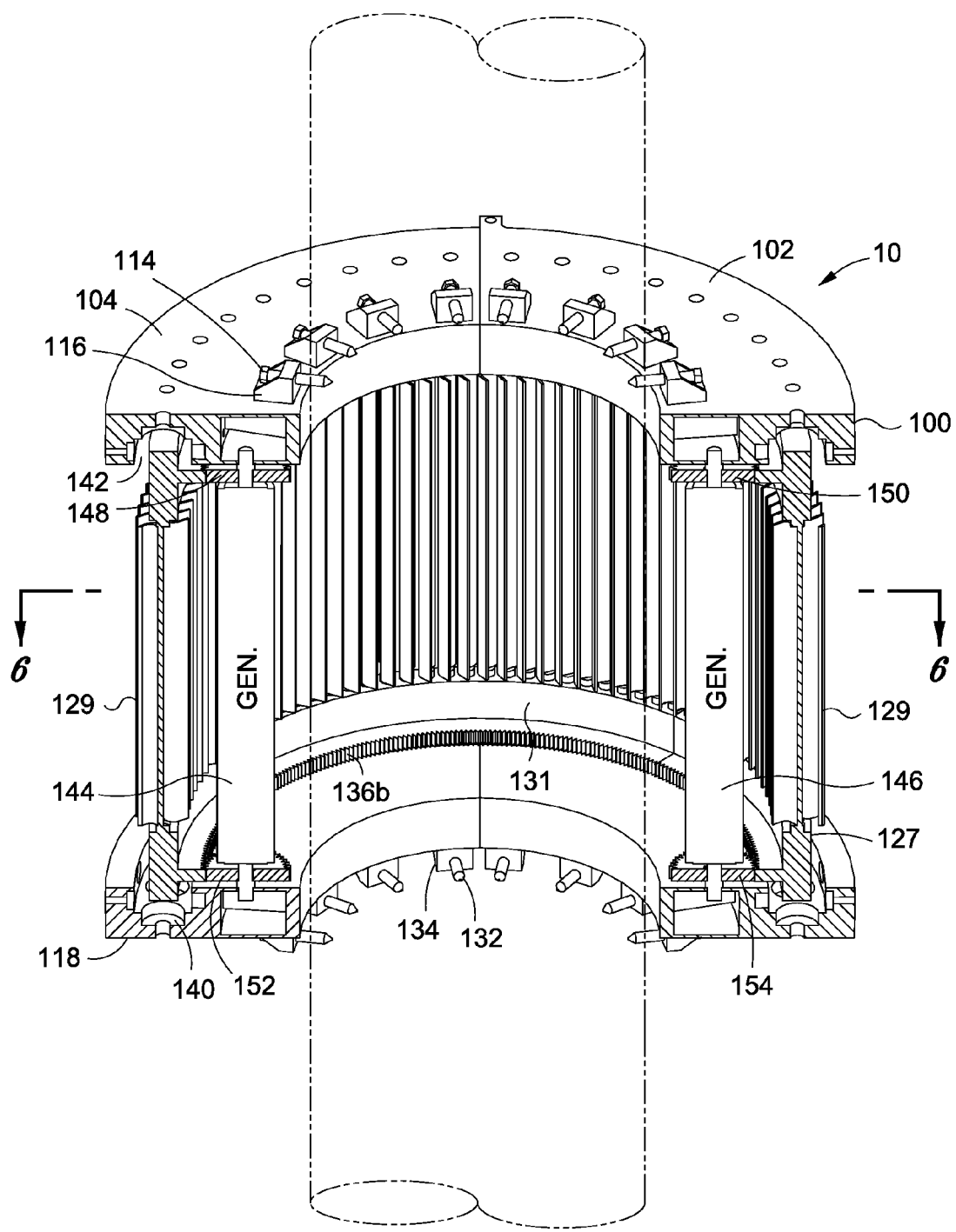
FIG. 5 is a side cross sectional view of the wind turbine of the present invention in accordance with one embodiment of the present disclosure.
Figure 6:
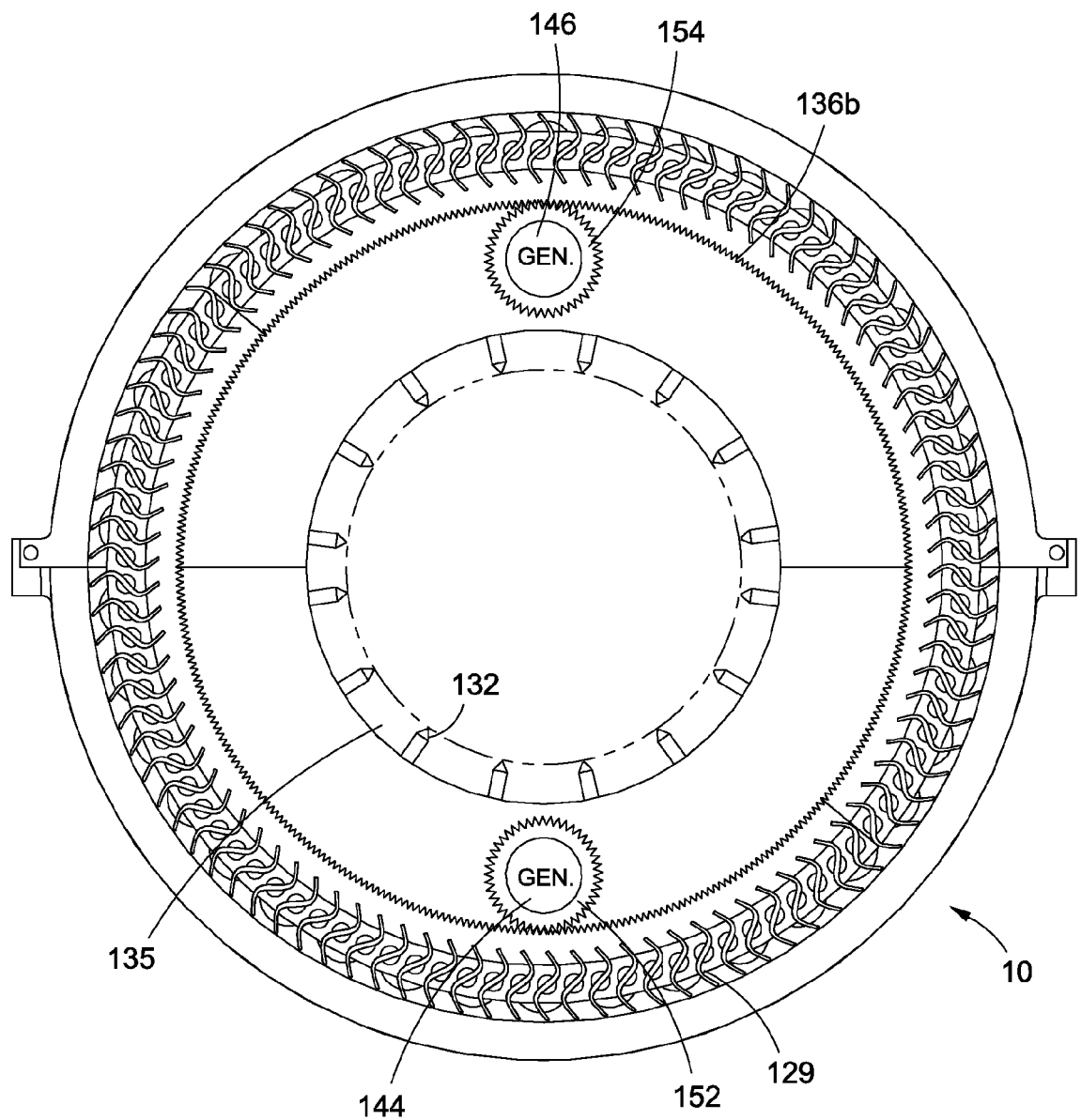
FIG. 6 is top cross sectional view of the wind turbine of the present invention in accordance with one embodiment of the present disclosure.

FIG. 5 provides a cross-sectional view of the wind turbine of the present invention and in an assembled state. FIG. 6 provides a cross sectional view along axis 6-6 as shown in FIG. 5. Referring particularly to FIGS. 5 and 6 the blades 129 are shown interconnected to the blade housing 127, wherein the blade housing 127 moves within the groove channel 138 of the bottom attachment ring 118 and groove channel 142 of the top attachment ring 100. The generator pairs 144 and 146 interface with the rotating housing 127 through the gear interface 136b on the bottom side with gears 152 for a generator located in generator pair 144 and gear 154 for a generator located in generator pair 146 along with gear interface 136a (not shown) via gear 148 for a generator located in generator pair 144 and gear 150 for a generator located in generator pair 146. In FIG. 6, the cross sectional view from axis 6-6 as shown in FIG. 5 shows a top down view in the interaction of the generator located in generator pair 144 and the generator located in generator pair 146 with gears 152 and 154 respectively interfacing with the gear interface 136b of the blade housing 127. The ends of the set screws 132 can be seen to be extended to interface with a light pole or other type structure to which the turbine 10 of the present invention may be attached. As shown in FIGS. 5 and 6, the set screws 132 are attached to the bottom ring 118 and held in place set guides 134. As with the top ring 100 there are a plurality of set screws 132 and associated set guide 134. Air may flow in and out of the cylinder of the blade housing in gap 135 which is formed between the annular ring and structure found within the inner opening 130.

Referring particularly to FIG. 11 there is shown an alternate use of the wind turbines 10 of the present invention. Wind turbines 10 are used in association with a motor vehicle 155. The wind turbines 10 are mounted to internal shafts 156 affixed within the vehicle 155. When in motion, air is taken into air intakes 158 and 160 of the motor vehicle 155. The air intake 158 and 160 pass air into air ducts 162 and 164. The air ducts 162 and 164 are tapered to condense air flow to a tapered out take ports 166 and 168. Because the air ducts 162 and 164 are tapered, air flow is forced through the out take ports 166 and 168 at an increased velocity to engage the blades 128 to cause rotation of the blade housing and thereby cause rotation of generators (not shown) located within the blade housing 127. Additional airflow and flow through airflow is redirected to the sides of the automotive vehicle through exhaust ports on the driver's and passenger's side, with exhaust ports 170 shown (exhaust port on passenger side not shown). Although the embodiment of the present invention is shown in FIG. 11 shows that the wind turbines 10 are inserted using the tapered ducts 162 and 164, it is contemplated that only one turbine or more than two turbines can be incorporated into a moving vehicle, aircraft or watercraft to take advantage of oncoming airflow. In this regard, it is contemplated by the present invention that the turbines 10 may be located anywhere on a motor vehicle, aircraft or watercraft where airflow can be received.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A wind turbine comprising:
    a first ring comprising first and second arcuate elements, said first and second arcuate elements adapted to interconnect circumferentially about an axis to form a first interconnected ring wherein said first interconnected ring incorporates a groove interface;
    a second ring comprising first and second arcuate elements, said first and second arcuate elements adapted to interconnect circumferentially about an axis to form a second interconnected ring wherein said second interconnected ring incorporates a groove interface;
    a fan blade cylindrical housing comprising:
        a first fan blade ring having first and second arcuate elements, said first and second arcuate elements adapted to interconnect to form a said first fan blade ring said ring having an interior gear interface;
        a second fan blade ring having first and second arcuate elements, said first and second arcuate elements adapted to interconnect to form said second fan blade ring said ring having an interior gear interface;
        at least one first side fan blade pivotally coupled to the first arcuate element of said first fan blade ring and the first arcuate element of said second fan blade ring, the at least one first side fan blade being selectively pivotable between first and second positions, a wind force acting on the at least one first side fan blade increasing as the at least one first side fan blade pivots from the first position toward the second position;
        at least one second side fan blade pivotally coupled to the second arcuate element of said first fan blade ring and the second arcuate element of said second fan blade ring, the at least one second side fan blade being selectively pivotable between first and second positions, a wind force acting on the at least one second side fan blade increasing as the at least one second side fan blade pivots from the first position toward the second position;
        wherein said first fan blade ring of said fan blade housing is adapted to be received within the groove interface of said first interconnected ring;
        wherein said second fan blade ring of said fan blade housing is adapted to be received within the groove interface of said second interconnected ring;
    at least one off-axis electrical generator having at least one rotating gear where said rotating gear is engaged and driven by at least one of said interior gear interfaces of said fan blade housing when said fan blade housing rotates about an axis within said groove interfaces of said first and second rings.

2. The wind turbine of claim 1 wherein said first and second arcuate elements of said first ring include arcuate grooves, wherein the interconnection of said first and second arcuate elements forms a continuous circular channel about said first ring.

3. The wind turbine of claim 1 wherein said first and second arcuate elements of said second ring include arcuate grooves, wherein the interconnection of said first and second arcuate elements forms a continuous circular channel about said first ring.

4. The wind turbine of claim 1 wherein said first ring includes at least two elongate set screws each having first and second ends, and at least two set guide affixed to said first ring to support said set screws, wherein said first ends of said set screws are adapted to provide contact to structures placed in the interior of said first ring.

5. The wind turbine of claim 4 wherein said second ring includes at least two elongate set screws each having first and second ends, and at least two set guide affixed to said second ring to support said set screws, wherein said first ends of said set screws are adapted to provide contact to a structure placed in the interior of said second ring.

6. The wind turbine of claim 5 wherein said the cooperative engagement of set screws of said first ring to a structure found within the interior of said first ring, and cooperative engagement of said set screws of said second ring to a structure found within the interior of said second ring provide support of the wind turbine upon a structure found within the interior of said first and second rings.

7. The wind turbine of claim 1 wherein said groove interfaces of said first ring and said second ring have at least one magnet within said groove interfaces.

8. The wind turbine of claim 6 wherein each of said first and second fan blade rings have at least one magnet attached thereto.

9. The wind turbine of claim 7 wherein said magnet is a rare earth magnet.

10. The wind turbine of claim 7 wherein said magnet is an electro magnet.

11. The wind turbine of claim 1 wherein said groove interfaces of said first ring and said second ring have at least one bearing within said grove interfaces.

12. The wind turbine of claim 11 wherein said at least one bearing is a ball bearing.

13. The wind turbine of claim 11 wherein said at least one bearing is a roller bearing.

14. A wind turbine comprising:
- a first ring adapted to interconnect circumferentially about an axis, wherein said first ring incorporates a groove interface;
- a second ring adapted to interconnect circumferentially about an axis, wherein said second ring incorporates a groove interface;
- a fan blade cylindrical housing comprising:
  - a first fan blade ring having an interior gear interface;
  - a second fan blade ring having an interior gear interface;
  - at least one fan blade pivotally coupled to said first fan blade ring and the said second fan blade ring, the at least one fan blade being selectively pivotable between first and second positions, a wind force acting on the at least one fan blade increasing as the at least one fan blade pivots from the first position toward the second position;
- wherein said first fan blade ring of said fan blade housing is adapted to be received within the groove interface of said first ring;
- wherein said second fan blade ring of said fan blade housing is adapted to be received within the groove interface of said second ring;
- at least one off-axis electrical generator having at least one rotating gear where said rotating gear is engaged and driven by at least one of said interior gear interfaces of said fan blade housing when said fan blade housing rotates about an axis within said groove interfaces of said first and second rings.

15. The wind turbine of claim 14 wherein said groove interfaces of said first ring and said second ring have at least one magnet within said groove interfaces.

16. The wind turbine of claim 15 wherein each of said first and second fan blade rings have at least one magnet attached thereto.

17. The wind turbine of claim 16 wherein said magnet is a rare earth magnet.

18. The wind turbine of claim 16 wherein said magnet is an electro magnet.

19. The wind turbine of claim 14 wherein said groove interfaces of said first ring and said second ring have at least one bearing within said grove interfaces.

20. The wind turbine of claim 19 wherein said at least one bearing is a ball bearing.

* * * * *